United States Patent
Lehmann et al.

(10) Patent No.: US 6,785,747 B2
(45) Date of Patent: Aug. 31, 2004

(54) METHOD AND SYSTEM FOR FLEXIBLE CHANNEL PATH IDENTIFIER ASSIGNMENT

(75) Inventors: Hans-Helge Lehmann, Weil im Schoenbuch (DE); Charles E. Shapley, Salt Point, NY (US); Robert A. Smith, Apalachin, NY (US)

(73) Assignee: International Business Machines Corporation, Armonk, NY (US)

(*) Notice: Subject to any disclaimer, the term of this patent is extended or adjusted under 35 U.S.C. 154(b) by 328 days.

(21) Appl. No.: 09/727,270

(22) Filed: Nov. 30, 2000

(65) Prior Publication Data

US 2002/0065963 A1 May 30, 2002

(51) Int. Cl.[7] ................................................. G06F 3/00
(52) U.S. Cl. ..................... 710/9; 710/3; 710/8; 710/10; 710/20; 710/21; 713/1; 713/2; 711/202; 711/206
(58) Field of Search ................................. 710/3–14, 20, 710/21; 711/202–206; 713/1, 2

(56) References Cited

U.S. PATENT DOCUMENTS

| | | | |
|---|---|---|---|
| 4,918,598 A | * 4/1990 | Ashkin et al. | ................. 710/3 |
| 5,317,693 A | * 5/1994 | Cuenod et al. | ................. 710/9 |
| 5,465,355 A | 11/1995 | Cook et al. | |
| 5,553,287 A | 9/1996 | Bailey et al. | |
| 5,568,648 A | 10/1996 | Coscarella et al. | |
| 5,644,712 A | 7/1997 | Coscarella et al. | |
| 5,666,557 A | * 9/1997 | Cassidy et al. | ................. 710/8 |
| 5,845,146 A | 12/1998 | Onodera | |
| 6,098,116 A | * 8/2000 | Nixon et al. | ................... 710/8 |
| 6,167,459 A | * 12/2000 | Beardsley et al. | ............. 710/3 |
| 6,226,729 B1 | * 5/2001 | Stevens et al. | ............. 711/171 |

* cited by examiner

*Primary Examiner*—Jeffrey Gaffin
*Assistant Examiner*—Mike Nguyen
(74) *Attorney, Agent, or Firm*—Connolly Bove Lodge & Hutz LLP; Arthur J. Samodovitz; Myron K. Wyche (57) ABSTRACT

A method and system for flexibly and efficiently assigning channel path identifiers (CHPIDs) used by operating system software in computer systems to identify the communication path to I/O devices via channels. To avoid wasted CHPIDs, which may be limited in number, CHPIDs are assigned only to channels which are installed on and configured to the computer system. The CHPIDs may be re-assigned concurrently with ongoing system operations via a user interface and/or an imported, pre-defined CHPID mapping.

43 Claims, 8 Drawing Sheets

FIG. 1A

CHANNEL CHPID ASSIGNMENT

ENTER THE PROPOSED CHPID ASSIGNMENT AND PRESS APPLY.

OPTIONS    VIEW    HELP

| CHANNEL LOCATION | | | MBA/STI | ASSIGNED | PROPOSED | ADAPTER |
| CAGE | CARD SLOT | JACK | BUS LINK | CHPID | CHPID | TYPE |
|---|---|---|---|---|---|---|
| A01A | LG20 | J.00 | 0-09 | 20 | | ← LINE 1 |
| A01A | LG22 | J.00 | 0-10 | 21 | | |
| A01A | LG22 | J.01 | 0-10 | 22 | | |
| " | | | | | | |

| PROPOSED CHPID CHANGE... |

| APPLY |   | VERIFY |   | CLEAR |   | EXIT |

FIG. 1B

THE IMPORT/EXPORT CHPID MAPPING TABLE/FILE:
THE TABLE FILE IS DEFINED AS AN ASCII .TRM FILE. THE PROPOSED STRUCTURE
OF THE CHPID MAPPING FILE RECORD IS AS FOLLOWS. EACH RECORD REPRESENTS ONE
CHANNEL PORT. IT IS VARIABLE IN LENGTH (MIN. 20, MAX. 80 CHARACTERS) AND TERMINATED BY
A CARRIAGE RETURN OR CARRIAGE RETURN-LINE FEED VALUE. THE FIRST 20 CHARACTERS ARE
A FIXED DEFINITION, THE NEXT 40 CHARACTERS ARE RESERVED FOR THE CABLE LABEL
INFORMATION, AND THE REMAINING CHARACTERS (IF ANY) ARE JUST COMMENTS.
 THE FIRST ENTRY ON AN EXPORT RECORD WILL BE A COMMENT WITH THE MACHINE TYPE,
MODEL NUMBER, AND SERIAL NUMBER IN THE COMMENT. THE MACHINE TYPE AT OFFSET 8,
THE MODEL AT OFFSET 16, AND THE SERIAL NUMBER AT OFFSET 32.

```
{
  ENTYPE[1];        ENTRY TYPE (CHAR "c" IF COMMENT, CHAR "m" IF MAPPING)
  BLANK[1];         ALWAYS BLANK
  CAGE[4];          4 CHARACTER CAGE LOCATION (E.G. A01A)
  SLOT[4];          4 CHARACTER CARD SLOT LOCATION (E.G. H203)
  JACK[4];          4 CHARACTER JACK LOCATION (E.G. J.01)
  BLANK2[1];        1 CHARACTER ALWAYS BLANK
  PROCHPID[2];      2 CHARACTER PROPOSED CHPID (MAY BE CURRENT CHPID)
  CHPIDSET[2];      2 CHARACTER CHPID SET INDICATOR (RESERVED)
  BLANK[1];         ALWAYS BLANK
  CABLELABEL[40]    RESERVED FOR A CE ENTERED CHARACTER CABLE INFORMATION LABEL
                    (SUPPLIED WITH EXPORT, IGNORED ON IMPORT)

} FLEXMAPFILEREC
```

METHOD AND SYSTEM FOR FLEXIBLE CHANNEL PATH IDENTIFIER ASSIGNMENT

BACKGROUND OF THE INVENTION

The present invention relates to a method and system for optimizing the I/O configuration of computer systems, and more particularly to enabling host computer systems utilizing channel path identifiers (CHPIDs) to flexibly assign the CHPIDs to channels.

CHPIDs are identifier data elements associated with channels, and are known in host computer systems (as used herein, the term "channel" refers generally to the collection of items, whether software or hardware, needed to communicate with a device; "CHPID" refers to a channel's logical identifier; and "channel port" refers to a physical structure residing on a channel card). For example, in mainframe computer systems designed and built by the International Business Machines (IBM) corporation, CHPIDs are used by the operating system software to identify the communication path to various I/O devices connected to the system. Each CHPID is associated with one channel port to which a control unit and/or device is connected. When the operating system performs I/O to a device over a particular channel, it uses the channel's CHPID to address the physical channel port. CHPIDs are limited in number, due to the constraints of system architecture.

In prior art systems, CHPIDs had a fixed assignment to channel ports. The system processor had access to channel card slots. Plugged into the slots were channel cards physically embodying channel ports; i.e., electronic circuitry for performing I/O operations to control units and devices connected to the channels. In setting up an I/O configuration for the system, each card slot was allotted a fixed number of sequential CHPIDs, corresponding to the maximum number of channels ports per card. Typically, this maximum number was four.

The foregoing arrangement had disadvantages. For instance, a situation known as "blocked CHPIDs," in which CHPIDs were unavailable for assignment to physical channel ports, frequently arose. Some types of channel cards might have fewer than the maximum number of channel ports (e.g., as few as one), but would occupy a card slot to which the maximum number of CHPIDs were assigned. This meant that some of the assigned CHPIDs were never used and were therefore wasted.

As the technology of computers has advanced, the number of available channel ports per channel card has acquired a range which reflects an increasing sophistication with which such cards may be utilized. Some channel cards may have only one physical channel port, while others, currently, may have as many as fifteen. If, for example, fixed CHPIDs were assigned based on fifteen maximum possible channels according to the above-described scheme, a one-channel card would waste fourteen CHPIDs. Thus, fixed CHPID assignments with current technologies would incur wastage of CHPIDs on an unacceptable scale.

Moreover, typically customers who buy upgrades to their mainframe systems have established CHPID-to-channel definitions which are reflected in the operating system software. The introduction of upgrades in the form of, for example, a next generation of processor or improved peripheral hardware typically had a disruptive effect in that a substantial and error-prone effort was necessary to re-assign CHPIDs to reflect the upgraded configuration.

In addition, mainframe customers often complained that almost identical I/O configurations, differing, for example, in only three or four of installed channel cards, could result in completely different CHPID assignments. A more homogeneous, machine-independent handling of CHPID assignments was regarded as preferable.

An approach is called for which addresses the above-described concerns.

SUMMARY OF THE INVENTION

In a method and system according to the present invention, CHPIDs are assigned based on the actual physical channel ports present in a computer system, rather than being allotted in fixed numbers to channel card slots. This avoids the deficiencies of the prior art wherein "blocked CHPIDs" were wasted.

In an embodiment, a default CHPID assignment may be initially established by sensing channel ports physically connected to the computer system, and assigning CHPIDs only to those channels. A user interface is provided allowing for re-assignment of CHPIDs concurrently with ongoing operations of the computer system.

The invention further provides for pre-defined CHPID mappings to be "exported," i.e., written to a computer-usable medium, and "imported," i.e., read from a computer-usable medium. This can provide substantial convenience to a user of the invention, in, for example, system upgrades, since the user does not need to perform the error-prone task of re-assigning CHPIDs to conform to the upgrades. Further, importing the CHPID mappings changes saves the effort of entering them manually via the user interface.

DETAILED DESCRIPTION OF THE INVENTION

The present invention provides a method and system for flexibly and concurrently, i.e., without affecting ongoing operations, assigning CHPIDs in a computer system, typically a mainframe computer system such as one having an IBM S/390 architecture. In an embodiment, the invention comprises a user interface which presents information visually in display panels of a service element (SE) used to service and control aspects of the main computer system. By manipulation of the SE through selectable user inputs, CHPID assignment may be accomplished in a number of modes.

In one mode, for example, an initial default assignment of CHPIDs may be performed, prior to bringing the main computer system into a fully operational state. The initial default assignment may be applied in a Power-On-Reset (POR) process applied to the computer system. The POR may be initiated by manipulation of the SE. During POR, an initial microcode load (IML) is performed. The IML builds channel configuration maps used by I/O handling routines of the main processor's operating system once fully operational. The channel configuration maps include the CHPID-to-channel mapping, and typically are part of a subset of system functions and data referred to as a "channel subsystem." To build the default CHPID-to-channel mapping of the channel subsystem, the IML causes code to be executed which senses what physical channel ports are present in the system, based on the channel cards installed. The code senses the hardware type of the channels, followed by their hardware address. To build the mapping, the code then assigns CHPIDs to channels starting with CHPID 0×00 (where "0×" indicates hexadecimal notation), and continuing sequentially. It is noted that the default mapping is not limited to the foregoing; alternative default mappings are also within the scope of the invention.

The CHPID-to-channel mapping is "persistent," meaning that the mapping initially established is unaffected by subsequent PORs, unless channels have been physically uninstalled or new channels are installed. The SE maintains a local I/O configuration record database containing the current CHPID mapping. If new channels, installed since the last POR, are sensed in a subsequent POR, unused CHPIDs are assigned to the new channels starting with the lowest unused CHPID number available. Similarly, the removal of previously installed channels is detected and CHPIDs are freed up accordingly.

Newly installed or uninstalled channels may also be sensed "concurrently," i.e., while the main computer system is fully operational, and default CHPIDs may be correspondingly assigned or freed up.

In another mode provided by the invention, CHPIDs generally may be assigned dynamically or concurrently, that is, concurrently with normal, ongoing operations by the main system such as the execution of application programs.

Figure 1A:
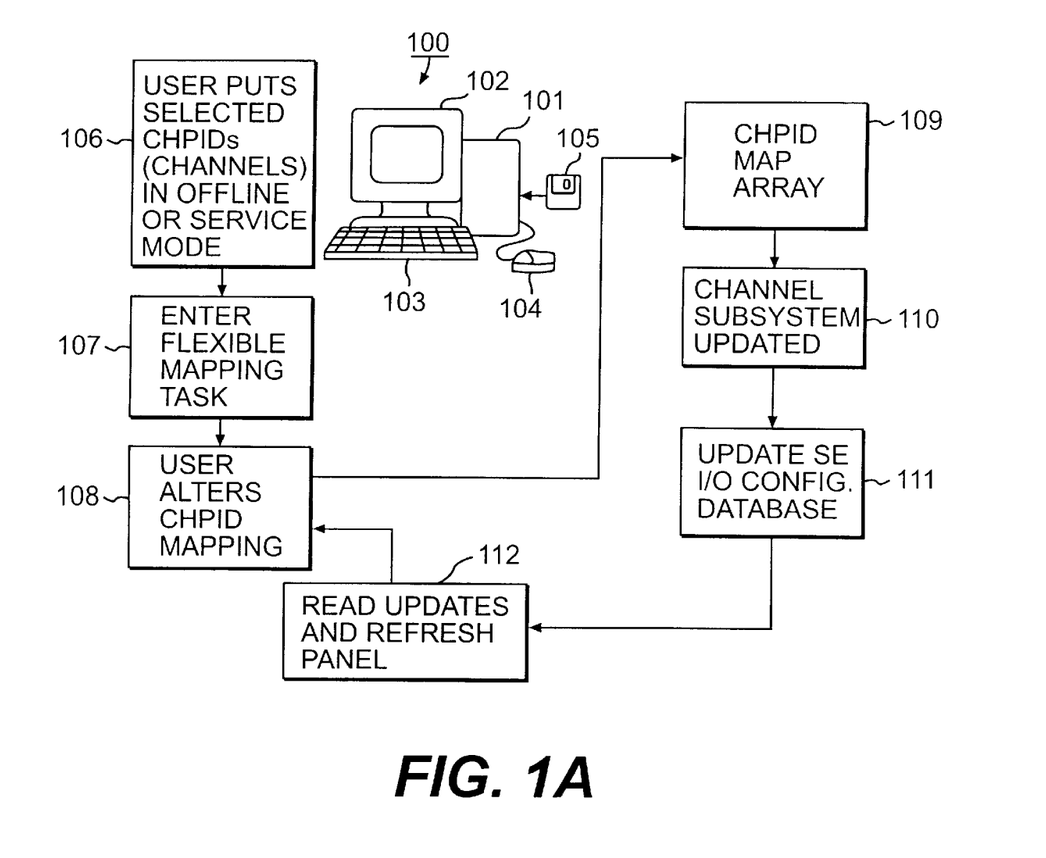
FIG. 1A is a functional block diagram illustrating elements and a processing flow of the invention.

CHPIDs may be assigned concurrently, for example, by user manipulation of the SE. The SE includes specialized software, and a local processor, memory and storage independent of the main computer system. Referring now to FIG. 1A, one possible embodiment of an SE 100 is symbolically illustrated as a personal computer system comprising a memory and processor unit 101. A user may view panels relating to CHPID assignment on a display device 102 of the SE 100, and enter inputs for changing CHPID assignment via an input device of the SE such as a keyboard 103 and/or mouse 104. The SE further comprises means, such as at least one diskette drive in unit 101, for reading from and writing to a computer-usable medium such as a diskette 105. As noted above, the SE provides an interface to users for servicing and controlling some of the functions of the main processor, also referred to herein as the "Central Electronic Complex" (CEC).

As shown in block 106, to perform a CHPID assignment change, the CHPID's currently associated channel must be placed "offline" (i.e., identified to the operating system as not in use, and unavailable), and in service mode. Taking a channel offline and placing it in service mode establishes a "manual reserved" state for the channel which prevents it from being allocated for use by the main system while its assignment is being changed.

To invoke a CHPID assignment (or re-assignment), a user would, for example, use a mouse to click on a "selectable channel CHPID assignment" task icon on a panel display, and the SE would enter into a flexible mapping task according to the invention, as shown in block 107. After checking to see whether the system was operational (IML complete), SE code would read the current CHPID-to-channel mapping from the local I/O configuration record database, and convert it into a displayable format for the user panel.

It is noted that if the main computer system is not operational, then the channels are inactive and only the local SE I/O configuration record database will be updated with any change in CHPID assignment. The SE database, in combination with any newly sensed changes in the channels installed, would be used in the next IML as the source of the most current CHPID-to-channel mapping to build the channel configuration mapping of the channel subsystem.

Figure 1B:
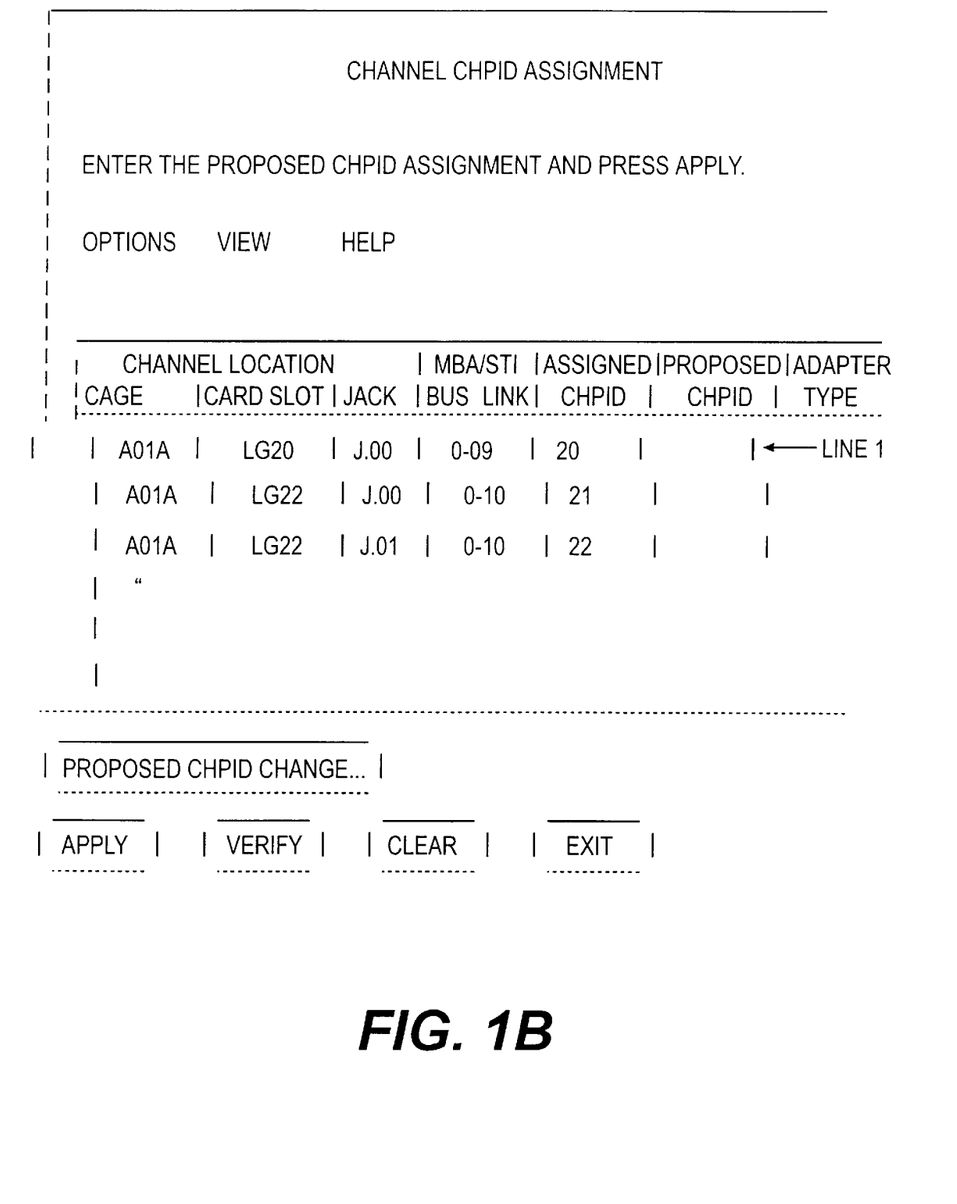
FIG. 1B shows a possible panel display of a user interface according to the invention.

FIG. 1B shows an example of one possible CHPID status panel display. CHPIDs are mapped to physical location (frame, cage, card slot, and channel port (jack)). A "frame" refers to a physical structure supporting I/O "cages." The I/O cages house card slots. As noted above, card slots receive channel cards, and the channel cards include ports physically accessed by jacks.

Line 1, for example, of FIG. 1B, specifies that CHPID 20 is assigned to port (jack) J.00 in card slot LG20. If, for example, a 3-port channel card were plugged into the card slot, jacks J.00–J02 would be displayed. If, on the other hand, a 15-port channel card were plugged into the card slot, jacks J.00-J.14 would be displayed. The port is in cage A01A in the cage indexing system of the example. The "MBA/STI" entries refer to internal buses that drive the cards. The display may include information specifying an adapter type. A panel may also be selected to display channel state.

Referring now to FIG. 1A, the user can alter the CHPID mapping as shown in block 108. This may be accomplished, for example, by selecting "Proposed CHPID Change" on the display panel illustrated in FIG. 1B. This invokes a pop-up window (not shown) in which the user may specify a current CHPID assignment and a proposed CHPID assignment changing the current assignment. At this stage, the change is only "proposed" because a number of validity checks must be performed before the change is actually put into effect, as described in greater detail below. The user may enter as many proposed CHPID changes as there are channels available.

After entering proposed CHPID re-assignments, the user may choose the "Apply" option as shown in FIG. 1B. This selection will cause the proposed mapping changes to be applied to the current system settings. The SE code performs the appropriate validity checks and, assuming the validity checks do not prevent it, passes a CHPID map array 109 to channel subsystem code, along with requests to update the channel configuration mapping of the main system with the proposed CHPID changes.

The channel subsystem code updates the channel configuration mapping with the proposed changes as shown in block 110. When this function completes successfully, the CHPID changes are active in the channel subsystem, and ongoing system operations can utilize the new CHPID numbers when the affected channels are brought back online.

When the channel subsystem code completes the updating function, it returns to the SE code, and the SE I/O configuration record database is updated with the new mapping, as shown in block 111.

As noted above, in the non-concurrent mode (POR/IML not complete) proposed changes are only saved locally in the SE I/O configuration record database. In either mode (concurrent or non-concurrent), each successful application of proposed CHPID assignments will also save an "undo" file; a plurality of levels of such "undo" files may be saved.

While the proposed CHPID changes are being applied, they will appear in the "Proposed CHPID" field of the display shown in FIG. 1B. Upon successful completion of an "Apply" function, the "Proposed CHPID" field will go blank. Via a read (block 112 of FIG. 1A) of the updated SE database, the new CHPID assignments will appear in the "Assigned CHPID" field.

As noted above, the SE code performs verification checks when the user selects "Apply." Some of the verification checks include checking for whether the proposed CHPID is valid; i.e., whether it corresponds to a physical channel installed and configured. Only physical channels installed and configured may be mapped. Further, checking is performed for whether the channel is in "manual reserved" (offline and service mode). As noted above, a channel must be in manual reserved state to be remapped, to ensure that the operating system does not attempt to allocate and use the channel during re-mapping. Additionally, the user-entered proposed CHPID changes are checked for duplication.

If the verification check detects that a selected channel is not in a manual reserved state, a warning message may be issued to the user. The warning will allow the proposed entry but inform the user that the change cannot be applied if the channel is not in a manual reserved state. If the channel is in a stand-by (inactive) state, the user may be offered the option of invoking a function to place the channel in a manual reserved state.

A "Verify" option may be offered to the user, as shown in FIG. 1B. Selecting this option will cause a validity check to be performed, but the proposed re-mapping will not be saved or applied. The "proposed" CHPID will remain as "proposed." "Clear" and "Exit" options may also be offered. The "Clear" option will blank out all proposed CHPID entries. No validation checking is performed. The "Exit" option will exit the panel. If there are proposed CHPID values entered, the user will be prompted to return or discard the proposed CHPID settings.

If no problems are detected by the verification checking, the SE code proceeds to build a map array of all CHPIDs. Within the array is the latest mapping, including the proposed changes, of CHPID to physical location (frame, cage, card slot, channel port jack)). CHPIDs that are not assigned to a physical or an internal channel are marked as unused in the array.

The SE code then issues requests to the channel subsystem code, as described above, to update the channel system with the proposed CHPID assignments. A more detailed discussion of how the foregoing is accomplished is given hereinafter.

The present invention also provides for the options of importing and exporting a desired CHPID mapping. Such options provide significant benefits to customers, for example, in view of the disruption caused by system upgrades as noted above. The export function allows a desired or pre-defined CHPID mapping to be downloaded (exported) to a computer-usable medium such as a diskette. The exported CHPID mapping may then be read (imported) from the diskette (or other computer-usable medium) at, for example, a customer site receiving an upgrade. The exported CHPID mapping may, for example, duplicate the customer's existing channel configuration, so that the customer does not need to perform the error-prone task of re-assigning CHPIDs to conform to the upgrade. Further, importing the CHPID mappings changes saves the effort of entering them manually as described above.

The import and export options may be displayed by a user by selecting the "Options" field as shown in FIG. 1B. This selection would cause a pop-up window (not shown), listing further user options available, including import and export.

As noted above, the SE typically includes means, such as at least one diskette drive, for reading from and writing to removable, portable computer-usable media, such as diskettes. When invoked at the appropriate SE panel, the export function will write a CHPID mapping file to a diskette loaded into an SE diskette drive. The file may have been generated by an optimization tool, generated from a pre-existing CHPID mapping, or manually edited prior to exporting, to define a desired mapping.

The import function will read a CHPID mapping file from a diskette drive of the SE, and check it for validity as described above in connection with the procedure for applying proposed CHPID assignments.

Figure 2:
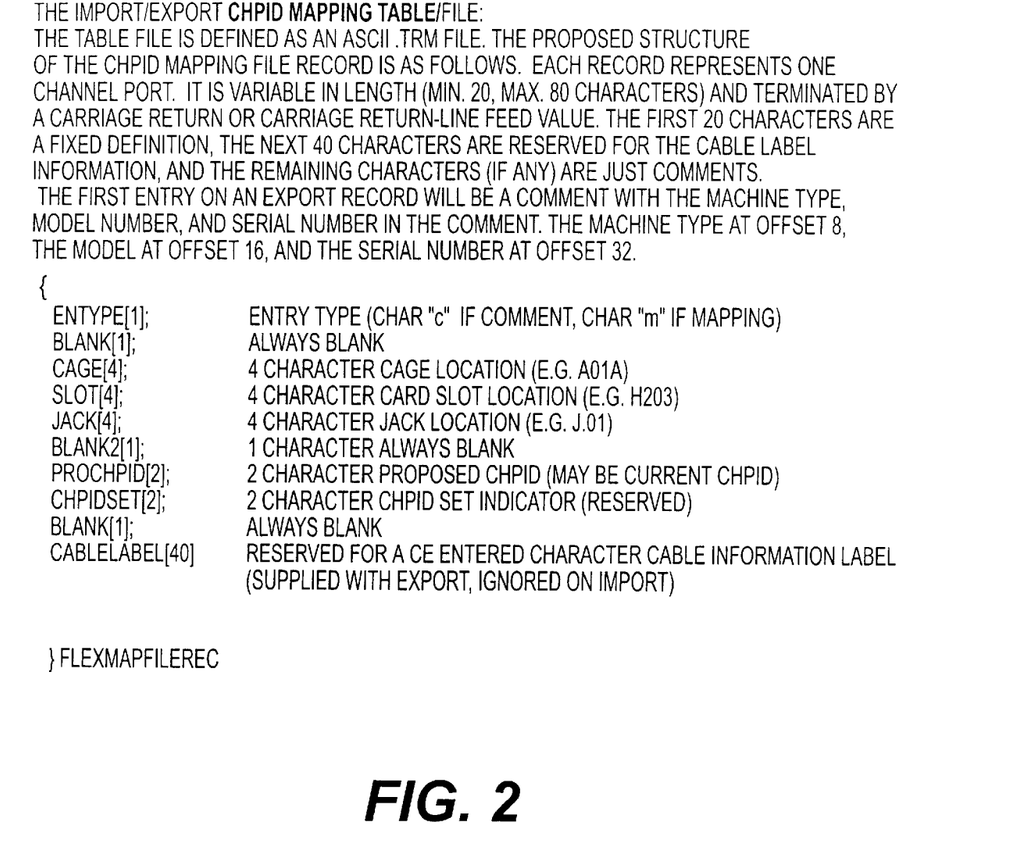
FIG. 2 shows a possible record format for an import/export file according to the invention.

FIG. 2 shows one possible format of records making up an import/export CHPID mapping file. Each record represents one channel port. As can be seen from FIG. 2, the information corresponds substantially to the information shown in the example display of FIG. 1B.

If one or more map import data records contains a channel location that is not installed and configured on the system, then that entry will be listed in a warning message, with a user option to continue or not. If the user elects to continue, the entry will be ignored.

If an import file record has the same CHPID value that is the currently assigned value for the corresponding channel location (i.e., no change), then that record will be ignored (nothing put in the "proposed" field).

Some import records may indicate proposed CHPIDs having a "swapped" status relating to a diagnostic procedure involving the swapping of cables to locate failing hardware. A warning message will be displayed and the user given the option of continuing or not. If the user continues, the entries affecting swapped channels will be ignored.

If the import file contains channel locations that are not currently in the "manual reserved" state, a warning message will be displayed but the user will have the option to continue.

The imported CHPID mapping will cause the "Proposed CHPID" field to be updated in the SE panel display as discussed above in connection with concurrent CHPID changes, but only if the imported mapping is different from the current mapping. The user must select "Apply" to make the imported assignments active. A reserved, non-swapped state is required for all channels being re-mapped.

Additional functions which may be invoked via the "Options" selection include "Undo" and "Reset to Default Assignment." As noted above, the "Apply" function saves the mapping at the time a valid "Apply" takes place. The changes are saved in temporary files. The "Undo" will read the most recent previous change and enter that mapping into the "Proposed CHPID" field. There may be a plurality of levels of "Undo" data. "Apply" must be selected in order to make the "Undo" mappings active. The "Undo" only affects CHPID assignment modifications.

Selecting the "Reset to Default Assignment" function will cause a warning message to be issued that all the CHPID assignments may change, and asking the user to decide whether or not to continue. If the operation is continued, the current local SE HOM and channel subsystem mappings will be erased, and new CHPID assignments will be made by applying the process for establishing an initial default assignment as described above. An "Undo" mapping will be saved.

A more detailed discussion of how the channel subsystem of the CEC is updated with proposed CHPID changes follows, in connection with FIGS. 3, 4A, 4B and 5.

Figure 3:
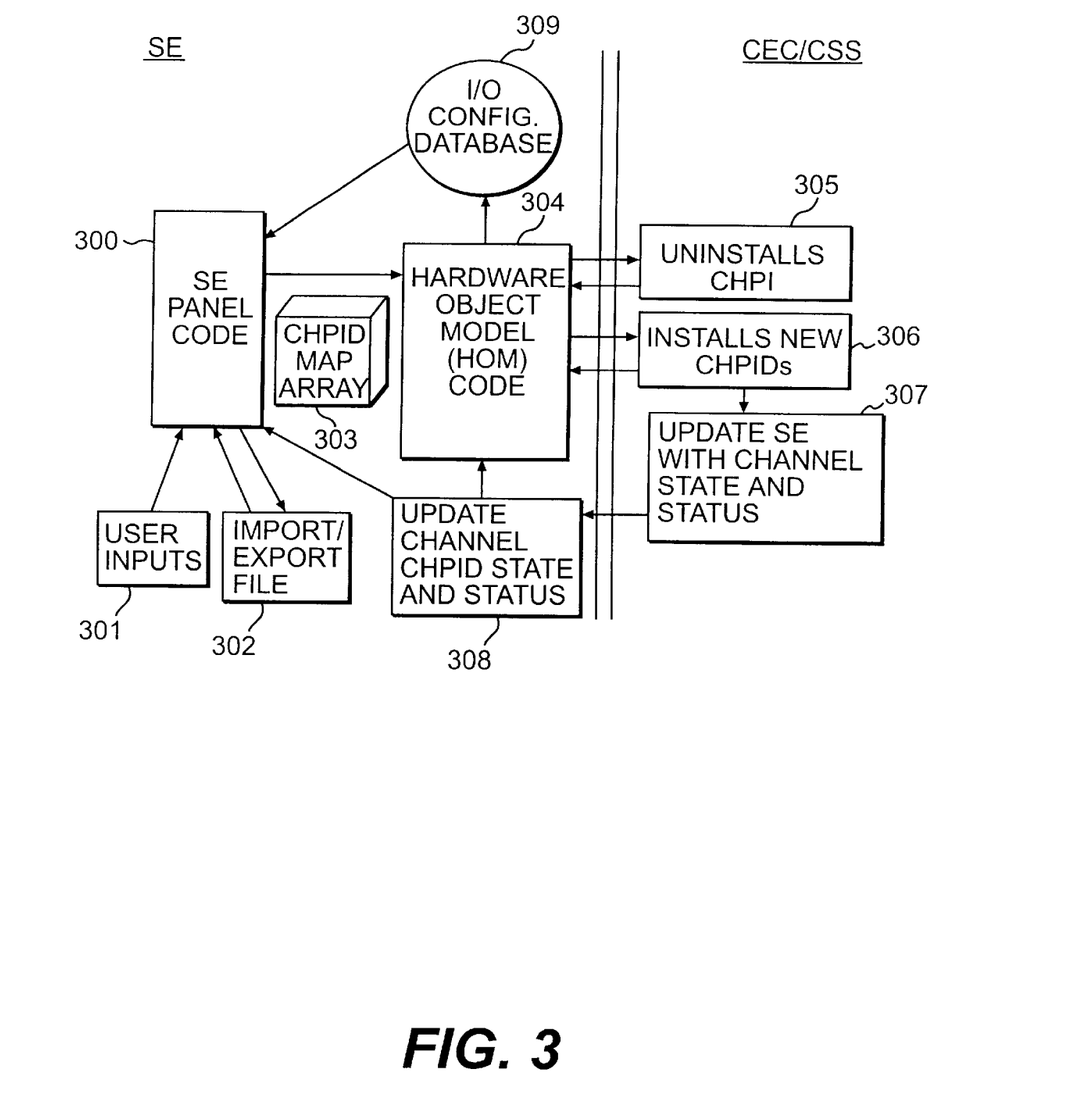
FIG. 3 is another functional block diagram illustrating elements and a processing flow of the invention.

FIG. 3 illustrates a partitioning of the invention between SE elements and CEC elements.

As shown in FIG. 3, on the SE side of the partition, SE panel code 300 accepts user inputs 301 via a display panel or import file 302 as described above, and builds a CHPID map array 303 reflecting proposed CHPID assignment changes. The array is passed to hardware object model (HOM) code 304, which sets up interfaces with the channel subsystem (CSS) in the CEC.

On the CEC/CSS side, a CHPID re-assignment is treated as an "uninstall" 305 followed by an "install" 306. The HOM code on the SE side sorts out, from the CHPID map array, which CHPIDs are to be uninstalled and installed, and passes requests (indicated by arrows directed from the HOM 304 to the uninstall/install blocks 305/306) to the CSS to perform the required uninstalls and installs. The HOM code also passes the CSS hardware address information for each channel. The hardware address uniquely identifies the electrical path of each channel.

As further shown in FIG. 3, the CSS responds to the HOM upon completion of an uninstall, and again upon completion of the subsequent install (indicated by arrows directed from the uninstall/install blocks 305/306 to the HOM 304). The CSS will then generate updated CHPID state and status 307 and send it to the SE. Code 308 for updating the CHPID state and status on the SE side will receive the updated state and status from the CSS and send it to the panel code 300 to refresh the panel display. (Channel "state" refers to such conditions as "online/offline," "stand-by" and "manual reserved" as mentioned above. Channel "status" refers to such conditions as whether a channel has a device attached and others.) The HOM code 304 collects the CSS changes, updates the SE I/O configuration record database 309 with the new CHPID mapping, and sends the panel code a return code. The panel code reads the updated I/O configuration record database to refresh the panel display.

Figure 4A:
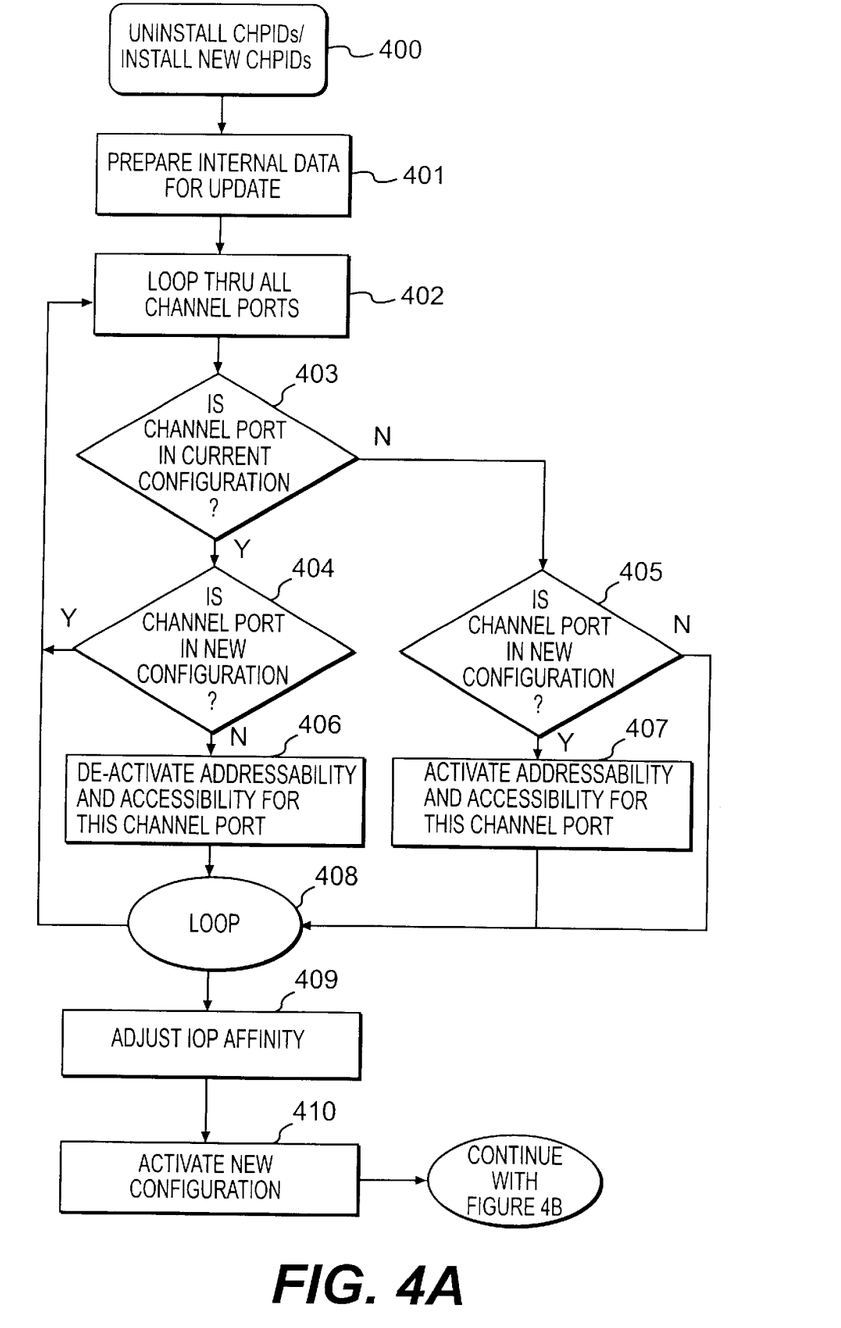
FIGS. 4A and 4B are flowcharts illustrating a possible processing sequence for updating CHPID mappings.
Figure 4B:
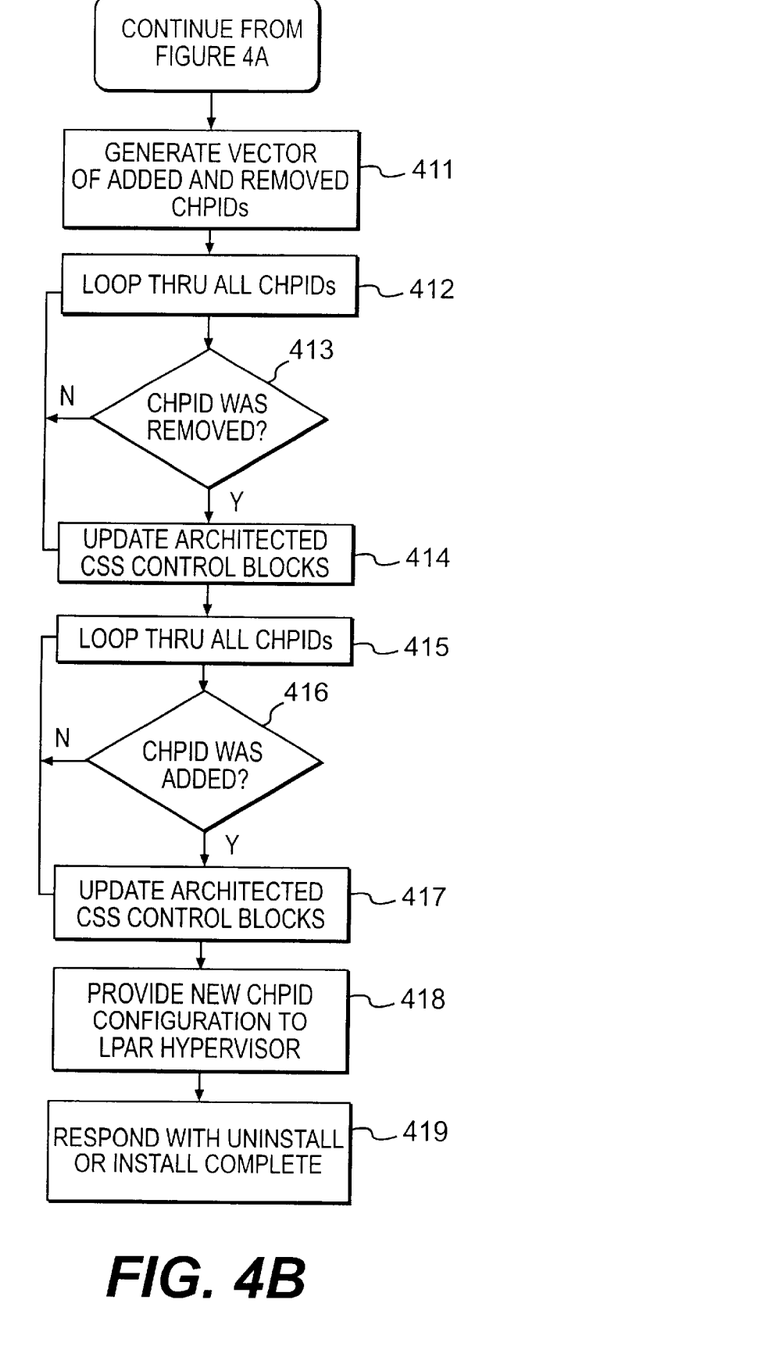

Operations on the CEC/CSS side are discussed in more detail in connection with FIGS. 4A and 4B. FIGS. 4A and 4B show a process flow in response to a request for an uninstall or an install from the SE.

Block 400 of FIG. 4A represents a request for an uninstall or install. In response to such a request, internal control blocks are set up as shown in block 401.

As noted earlier, the CHPID map array generated by the SE side and passed to the CSS includes a CHPID-to-channel mapping. A step of looping through all channel ports included in the CHPID map array is entered as shown in block 402, to determine which of the channel ports might need physical addressability activated as a result of being newly configured the mapping, and which ports might need to have physical addressability de-activated due to being excluded from the new mapping.

Thus, within the loop, for each channel port the CSS determines whether it is in the current channel port configuration, as shown in block 403. If it is, block 404 determines whether it is in the new configuration. If block 404 indicates that the channel port is not in the new configuration, physical addressability and accessibility are de-activated for the channel port as shown in block 406, and the loop processes the next channel port (blocks 408, 403). If block 404 indicates that the channel port is in the new configuration, then it need not be de-activated, and the loop processes the next channel port.

If block 403 determines that the channel port is not in the current configuration, block 405 is executed to determine whether it is in the new configuration. If it is, addressability and accessibility need to be activated for the channel port, and accordingly block 407 is executed. If not, no accessibility is needed, and the next channel port is processed.

After the loop is finished, a step 409 of adjusting I/O processor (IOP, also known as System Assist Processor, SAP) affinity may be performed. This is done because the CEC typically includes specialized microprocessors (IOPs) dedicated to certain channels for greater efficiency.

Next, the new channel port configuration established by the foregoing is activated as shown in block 410. The process flow continues in FIG. 4B.

As shown in block 411, the CSS code generates a vector of the added and removed CHPIDs, using the data provided in the CHPID map array sent over from the SE side. Then, the CSS proceeds to loop through all the CHPIDs in the generated vector to determine which CHPIDs were removed, and to update the corresponding architected CSS control blocks accordingly, as shown in blocks 412–414. The CSS control blocks include data correlating configuration and status information of particular physical channel ports to the corresponding CHPIDs.

Blocks 415–417 represent the steps for updating the CSS control blocks to reflect the adding of CHPIDs.

Block 418 may be performed to accommodate an operational mode which is available on IBM S/390 systems. Such systems are able to operate in a "logical partition" mode, in which many separate logical processors and operating systems can be executing simultaneously. The LPAR Hypervisor software manages the partitioning. Because some of the channels could be shared by the partitions, the LPAR Hypervisor needs to be provided with the new CHPID configuration.

As shown in block 419, after the foregoing steps, the uninstall or install is complete, and the CSS notifies the SE as described above. It is noted that while FIG. 4B shows the uninstall/install process executing serially, the process may alternatively first perform all uninstalls, respond to the SE with uninstalls complete, then perform all installs and respond to the SE.

It is further noted that CHPID additions alone, or CHPID deletions alone, can be effected by a process similar to that described above. Such CHPID additions or deletions alone might be performed concurrently (during system operations), for example, to reflect the addition or removal of channel cards.

In a panel similar to the one described above in connection with CHPID reassignment, a user may specify CHPIDs proposed to be added to or deleted from (as opposed to re-assigned) the current mapping.

Figure 5:
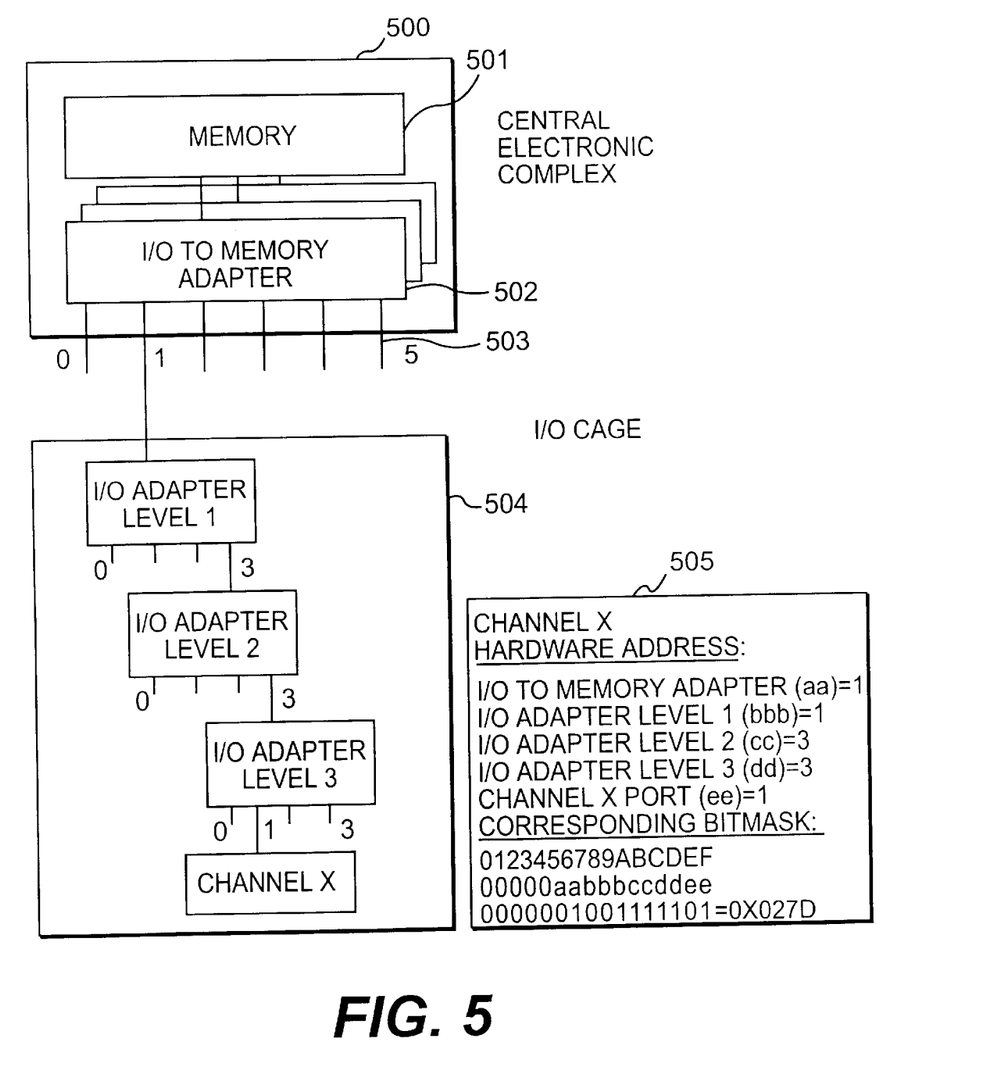
FIG. 5 illustrates an example of an electrical path corresponding to a channel port (including the hardware address)

FIG. 5 shows how the CEC addresses a channel using the hardware address describing a certain physical path which is provided by the HOM code in the SE, when activating or de-activating addressability to a channel port as described above. FIG. 5 shows the CEC 500 comprising memory 501 and I/O to memory adapter 502. A physical channel in addition may include a link from the I/O to memory adapter 502 to the I/O adapter level 1 in an I/O cage 504 as well as additional levels of I/O adapters (as an example, 3 levels of I/O adapters are shown).

As an arbitrary example, as shown in the box labeled 505, channel X has a hardware address of 0x027D as indicated by the physical connections shown. At the lowest level, the channel is connected to port 1 of the I/O adapter level 3. At the next level, the I/O adapter level 3 is connected to port 3 of the I/O adapter level 2. At the next level, the I/O adapter level 2 is connected to port 3 of the I/O adapter level 1. Then, the I/O adapter level 1 is using link number 1 of the I/O to memory adapter 502. The I/O to memory adapter is number 1 out of a certain number of such I/O to memory adapters available in the system.

The bitmask shown indicates the bit positions corresponding to the above-described hierarchy, and the binary values of the corresponding connecting bits. Thus, assigning this hardware address to a certain CHPID, when appropriately decoded, enables the corresponding channel port to be addressed (addressability 406 in FIG. 4A). Accessibility 406 in FIG. 4A is established by enabling the affected hardware ports to route certain information to the next level in the shown hardware hierarchy.

In view of the foregoing description, it may be appreciated that the present invention avoids the deficiencies of the prior art and provides for substantial advantages by efficiently assigning CHPIDs. CHPIDs are assigned only to channels physically installed on and configured to the system, thereby avoiding wasted or blocked CHPIDs.

As is further clear from the above discussion, elements of the invention are implemented as computer-executable instructions which when executed perform steps of the described method. The instructions are tangibly embodied in a program module or modules stored on computer-usable media.

For example, computer-executable instructions for implementing the SE functions described above may be written in microcode and may be stored on a suitable computer-usable medium. Similarly, channel subsystem code for building an updated CHPID mapping may also be written in microcode, stored on a suitable computer-usable medium and may be executed in the CEC 500 shown in FIG. 5.

Figure 6:
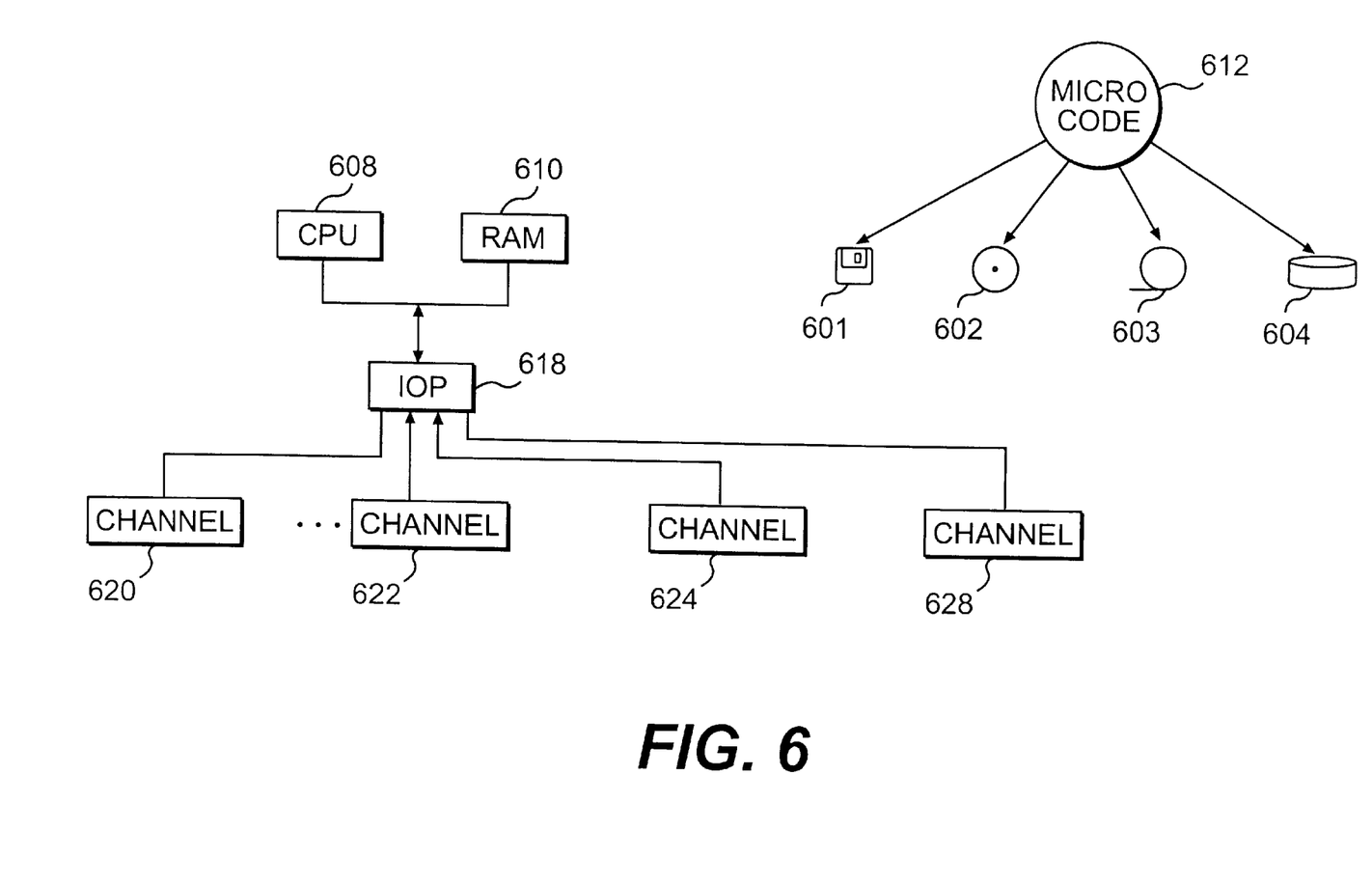
FIG. 6 shows a general purpose host computer system for processing computer-executable instructions according to the invention.

FIG. 6 shows a high-level representation of a general purpose host computer for implementing an embodiment of the invention in the form of computer-executable instructions, such as might be realized by a variety of known and commercially available hardware and software elements. The system comprises a memory 610, one or more central processing units 608, one or more I/O processors 618, and one or more channels (e.g., 620, 622, 624, 628).

A computer internal program or a collection of computer internal programs (microcode 612) comprising computer-executable instructions for performing method steps according to the present invention may be stored and transported on computer-usable media such as diskette 601, CD-ROM 602, magnetic tape 603 and fixed disk 604. To perform the steps of the method, the instructions may be retrieved from the computer-usable media 601–604, using, for example, drive means attached to the SE, and executed in the SE; or may be loaded into memory 610 and executed by an I/O processor 618. The method disclosed hereinabove may find specific implementations in a variety of programming structures and data forms, which are considered to be within the abilities of a programmer of ordinary skill in the art after having reviewed the specification.

The foregoing description of the invention illustrates and describes the present invention. Additionally, the disclosure shows and describes only the preferred embodiments of the invention, but it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention as such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A channel path identifier (CHPID) assignment system, comprising:
   an initial microcode load (TML) program that senses channels configured for use based on channel cards that are currently installed in a computer system and builds channel configuration mans that include a default CHPID-to-channel mapping of said computer system;
   a service element containing a database of CHPIDs and associated channel assignments based on the default CHPID-to-channel mapping;
   means for sensing changes to the channels configured for use; and
   means for assigning CHPIDs and channels made available by changes to the channels configured for use,
   wherein the database of CHPIDs and associated channel assignments is updated concurrently with the chan es to the channels configured for use even if the computer system is not operational and the channels are inactive, and
   a next IML program builds a new CHPID-to-channel mapping based on the updated database of CHPIDs and associated channel assignments.

2. The CHPID assignment system of claim 1, said assigning means comprising user interface means for applying a re-assignment of a currently assigned CHPID to a different channel.

3. The CHPID assignment system of claim 2, further comprising application means for applying said re-assignment to a current channel configuration of said computer system.

4. The CHPID assignment system of claim 3, wherein said re-assignment may be performed concurrently with normal operations of said computer system.

5. The CHPID assignment system of claim 3, said application means comprising:
   and means for building said new CHPID-to-channel mapping based on said re-assignment; means for requesting a channel subsystem of said computer system to establish said new CHPID-to-channel mapping as the current channel configuration of said computer system.

6. The CHPID assignment system of claim 5, said channel subsystem comprising:
   means for activating or dc-activating channels based on said mapping; and
   means for assigning CHPIDs to activated channels based on said mapping.

7. The assignment system of claim 2, said user interface means comprising at least one display panel displaying a current CHPID assignment status, and input means for changing said current CHPID assignment status.

8. The CHPID assignment system of claim 7, wherein said panel displays a CHPID and an associated channel physical location.

9. The CHPID assignment system of claim 2, wherein a user manipulates said user interface means to enter inputs directing a proposed change of CHPID assignments.

10. The CHPID assignment system of claim 9, further comprising means for checking the validity of said proposed change.

11. The CHPID assignment system of claim 1, said assigning means comprising means for recording a pre-defined CHPID assignment on a computer-usable medium.

12. The CHPID assignment system of claim 1, said assigning means comprising means for reading a pro-defined CHPID assignment recorded on a computer-usable medium.

13. A method for assigning channel path identifiers (CHPIDs), comprising the steps of:
   sensing channels configured fir use based on channel cards that are currently installed in a computer system and building channel configuration maps that include a default CHPID-to-channel mapping said computer system with an initial microcode load (IML) program;
   providing a service element containing a database of CHPIDs and associated channel assignments based on the default CHPID-to-channel mapping;
   sensing changes to the channels configured for use; and
   assigning CHPIDs and channels made available by changes to the channels configured for use,
   wherein the database of CHPIDs and associated channel assignments is undated concurrently with the changes to the channels configured for use even if the computer system is not operational and the channels are inactive, and
   a next IML ore gram builds a new CHPID-to-channel mapping based on the updated database of CHPIDs and associated channel assignments.

14. The method of claim 13, further comprising re-assigning a currently assigned CHPID to a different channel.

15. The method of claim 14, wherein said channel is included in a current channel configuration of said computer system.

16. The method of claim 14, wherein said CHPID is re-assigned concurrently with normal operations of said computer system.

17. The method of claim 14, said step of re-assigning comprising:
   building a new CHPID-to-channel mapping based on said step of re-assigning and
   requesting a channel subsystem of said computer system to establish said new mapping as the current channel configuration of said computer system.

18. The method of claim 17, said step of requesting comprising:
   activating or dc-activating channels based on said mapping; and
   assigning CHPIDs to activated channels based on said mapping.

19. The method of claim 13, further comprising:
   providing a user interface comprising at least one display panel;
   displaying a current CHPID assignment status on said display panel; and
   providing input means for changing said current CHPID assignment status.

20. The method of claim 19, wherein said panel displays a CHPID and an associated channel physical location.

21. The method of claim 19, further comprising manipulating said user input means inputs directing a proposed change of CHPID assignments.

22. The method of claim 21, further comprising checking the validity of said proposed change.

23. The method of claim 13, further comprising recording a pre-defined CHPID assignment on a computer-usable medium.

24. The method of 13, further comprising reading a pre-defined CHPID assignment recorded on a computer-usable medium.

25. A computer-usable medium storing computer-executable instructions, said instructions when executed implementing a process comprising:
   sensing channels configured for use based on channel cards that are currently installed in a computer system and building channel configuration mans that include a default CHPID-to-channel mapping of said computer system with an initial microcode load (IML) program;
   providing a service element containing a database of CHPIDs and associated channel assignments based on the default CHPID-to-channel mapping:
   sensing changes to the channels configured for use; and
   assigning CHPIDs and channels made available by changes to the channels configured for use,
   wherein the database of CHPIDs and associated channel assignments is updated concurrently with the changes to the channels configured for use even if the computer system is not operational and the channels are inactive, and
   a next IML program builds a new default CHPID-to-channel mapping based on the undated database of CHPIDs and associated channel assignments.

26. The computer-usable medium of claim 25, further comprising re-assigning a currently assigned CHPID to a different channel.

27. The computer-usable medium of claim 26, said step of re-assigning further comprising:
   building a new CHPID-to-channel mapping based on said step of re-assigning and requesting a channel subsystem of said computer to establish said new mapping as the current channel configuration of said computer system.

28. The computer-usable medium of claim 27, said step of requesting comprising:
   activating or de-activating channels based on said mapping; and
   assigning CHPIDs to activated channels based on said mapping.

29. The computer-usable medium of claim 25, said process further comprising
   providing a user interface comprising at least one display panel;
   displaying a current CHPID assignment status on said display panel; and
   providing input means for changing said current CHPID assignment status.

30. The computer-usable medium of claim 29, wherein said panel displays a CHPID and an associated channel physical location.

31. The computer-usable medium of claim 29, said process further comprising manipulating said user input means to enter inputs directing a proposed change of CHPID assignments.

32. The channel path identifier (CHPID) system according to claim 1, further comprising means for placing a channel off-line, responsive to a user request to discontinue use of a corresponding channel, and means for un-assigning the CHPID assigned to said off-line channel, such that the means for assigning can reassign the unassigned CHPID) to another channel.

33. A channel path identifier (CHPID) system according to claim 1, further comprising means for enabling a user to assign specific CHPIDs to channels currently listed in said channel configuration map, wherein the CHPIDs specified by said user differ from the CHPIDs assigned by the assigning means.

34. The channel path identifier (CHPID) system according to claim 32, wherein said means for placing a channel off-line further comprises means for notifying an operating system in said computer system that said channel is off-line and not currently available for use.

35. A channel path identifier (CHPID) system according to claim 33, further comprising means for verifying that said user assignment of specific CHPIDs is consistent with currently installed channel cards.

36. The channel path identifier (CHPID) system according to claim 13, further comprising placing a channel off-line, responsive to a user request to discontinue use of a corresponding channel, and un-assigning the CHPID assigned to said off-line channel, such that the step of assigning can reassign the unassigned CHPID to another channel.

37. A channel path identifier (CHPID) system according to claim 13, further comprising enabling a user to assign specific CHPIDs to channels currently listed in said channel configuration map, wherein the CHPIDs specified by said user differ from the CHPIDs assigned by assigning CHPIDs and channels.

38. The channel path identifier (CHPID) system according to claim 36, wherein said placing a channel off-line further comprises notifying an operating system in said computer system that said channel is off-line and not currently available for use.

39. A channel path identifier (CHPID) system according to claim 37, further comprising verifying that said user assignment of specific CHPIDs is consistent with currently installed channel cards.

40. The channel path identifier (CHPID) system according to claim 25, further comprising placing a channel off-line, responsive to a user request to discontinue use of a corresponding channel, and un-assigning the CHPID assigned to said off-line channel, such that the step of assigning can reassign the unassigned CHPID to another channel.

41. A channel path identifier (CHPID) system according to claim 25, further comprising enabling a user to assign specific CHPIDs to channels currently listed in said channel configuration map, wherein the CHPIDs specified by said user differ from the CHPIDs assigned by assigning CHPIDs and channels.

42. The channel path identifier (CHPID) system according to claim 40, wherein said placing a channel off-line further comprises notifying an operating system in said computer system that said channel is off-line and not currently available for use.

43. A channel path identifier (CHPID) system according to claim 41, further comprising verifying that said user assignment of specific CHPIDs is consistent with currently installed channel cards.

* * * * *